Nov. 7, 1961   C. BERTHER   3,007,921
PROCESS FOR THE PRODUCTION OF CAPROLACTAM
Filed Nov. 10, 1959
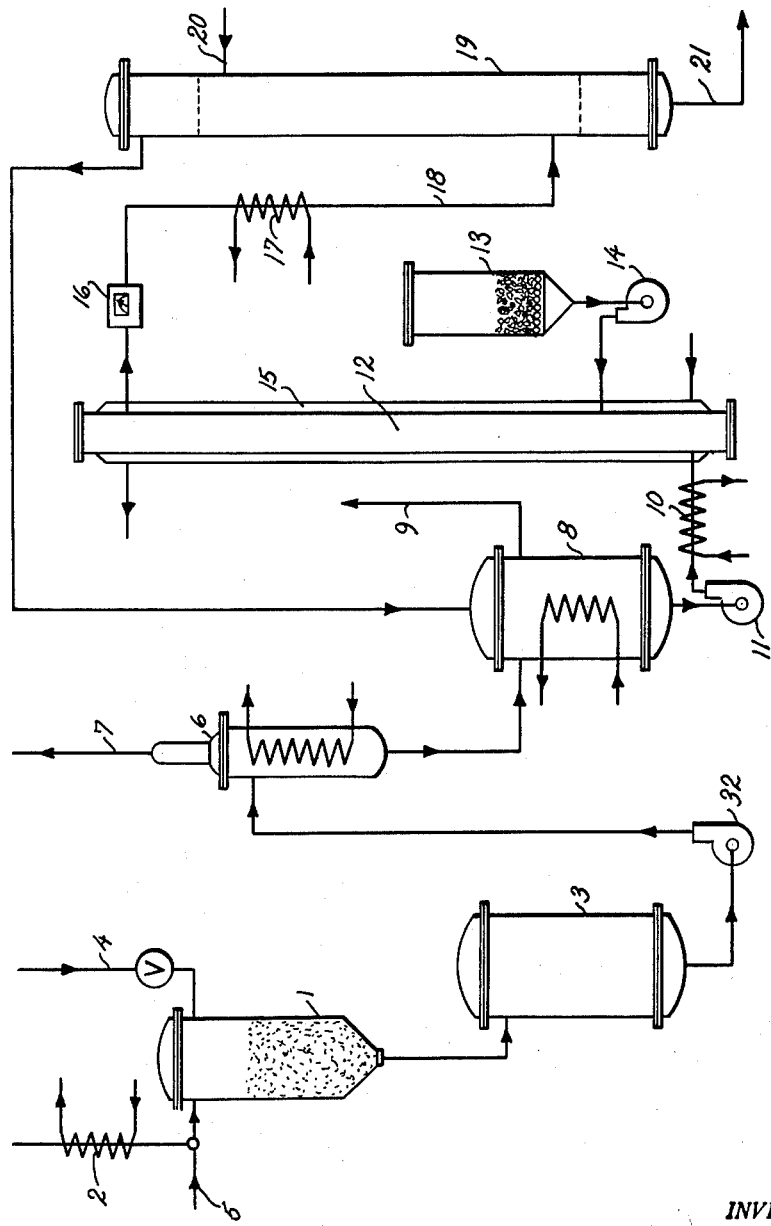
INVENTOR.
CLAU BERTHER
BY Mestern & Rollin
ATTORNEYS United States Patent Office 3,007,921
Patented Nov. 7, 1961

3,007,921
PROCESS FOR THE PRODUCTION
OF CAPROLACTAM
Clau Berther, Chur, Switzerland, assignor to Inventa
A.G. fur Forschung und Patentverwertung, Zurich,
Switzerland
Filed Nov. 10, 1959, Ser. No. 852,087
Claims priority, application Switzerland Nov. 13, 1958
3 Claims. (Cl. 260—239.3)

The invention relates to the production of caprolactam and, more particularly, to an increase in yield and purity thereof.

As is known, the polymerization of caprolactam does not proceed completely, but only to an equilibrium which lies approximately at 88–92 percent polycaprolactam and 8–12 percent monomer and oligomer. Products manufactured from a polycaprolactam melt, such as fibers and wires, hence contain certain quantities of monomeric and oligomeric caprolactam which usually are washed out with hot water because they sweat out of the polymer and produce a sticky surface, were they allowed to remain in the polymer. Granulated polycaprolactam likewise contains low-molecular constituents when produced directly from the polymer which also must be washed out before fabrication of the granules. The wash waters thus obtained generally contain these low-molecular constituents in low concentration so that reclaiming by evaporation of the water becomes uneconomical especially since the oligomers and monomers, before re-use, must be regenerated into lactam.

Beside monomeric and oligomeric or low-polymeric lactam in low concentration in the wash water, large-scale production also yields waste polymer which also is to be returned into the process. To date, waste polymer generally has been freed from mechanical impurities and then depolymerized with water, but mostly in the presence of acids or alkalies. In that manner, caprolactam can be recovered at a yield up to 60 percent calculated on the amount of waste polymer (cf. H. Ludewig and K. Froeber, Faserforschung & Textiltechnik 1954, Nr. 7, pp. 277 ff.) by extracting the depolymerization product with water thus freeing the lactam from insufficiently depolymerized products.

The same authors also propose a utilization of the waste polymers not by depolymerization but by dissolving the polymer in water under pressure followed by filtration. The polymer solution thus obtained is returned directly into the polymerization reactor. This method has the drawback that discolored products cannot be returned to the reaction.

It now has been found that lactam can be recovered from dilute wash water and from the polymer in an economical manner by hydrolizing the low-molecular products, by means of treatment in ion exchangers, to aminocaproic acid and simultaneous concentration, heating the solution thus obtained together with polycaprolactam under pressure above 150° C., extracting the solution now obtained with solvents for lactam, which are immiscible with water, and recovering from the extract the lactam in the usual manner. As a solvent for lactam which is immiscible with water, chloroform, benzene, mixtures of benzene with cyclohexane can be used.

Obviously, the depolymerization with water containing aminocaproic acid under pressure and at elevated temperatures is not complete. Hence, the extraction residue, together with fresh aminocaproic acid solution and fresh waste polymer, is recycled into the depolymerization step. In the original depolymerization, monomeric and oligomeric lactam is obtained in quantities of 22 to approximately 74 percent monomeric lactam and 26 to 32 percent oligomers, depending upon the concentration of the depolymerization solution and the temperature applied for depolymerization. This is shown in detail in Table 1.

TABLE 1

| Depolym. Temp., ° C. | Reaction Time (hrs.) | Sol. Conc., percent | Cold-Water-Insol., percent | Oligomer, percent | Lactam Monomer, percent |
|---|---|---|---|---|---|
| 220 | 7 | 12.25 | 45.5 | 31.9 | 22.6 |
| 250 | 7 | 12.25 | -------- | 37.0 | 63.0 |
| 220 | 7 | 16.40 | 57.0 | 25 | 18.0 |
| 250 | 7 | 17.40 | 4.7 | 39.8 | 55.5 |
| 275 | 7 | 12.25 | -------- | 26.6 | 73.4 |

The process according to the invention now will be further explained by the following example and with reference to the accompanying drawing. However, it should be understood that these are given merely by way of illustration, not of limitation, and that numerous changes may be made in the details without departing from the spirit and the scope of the invention as hereinafter claimed.

*Example*

The ion exchanger column 1 (length 200 cm., I.D. 103 cm.) is loaded with 1,000 liter activated ion exchanger resin Permutit RS. An aqueous extract of 1 percent concentration, obtained by washing polyamide (polycaprolactam) fibers, is filled into column 1 by way of heater 2. The temperature is 115° C. and the liquid flows through at a rate of 1.02 cm.$^3$/min. After 40 hours, 20,500 liters extract water have flown through the column. This corresponds to 205 kg. low-molecular constituents which are composed of 75 percent monomeric and 25 percent oligomeric lactam. Size and other impurities in the wash water amount to merely a few percent and are not considered in the above calculation. The monomer and oligomer or low-polymer content of the solution which has flown through the column corresponds to the capacity of the ion exchanger resin to accept ε-aminocaproic acid (capacity 1.75–1.85). After completion of the reaction, a wash with 2,000 l. water is carried out, and then the column is rinsed from below for 30 minutes with 6,000 l./h. water. This serves for the separation of the resin and its purification from adhering residual impurities. The desorption of the aminocapric acid now is started. This is carried out by first entering 1,000 l. 8–10 percent aqueous ammonia into the column by way of pipe 4. The first 400 liter flowing out of the column correspond to the 40 percent empty volume of the resin and can be discarded since no amino acid is contained therein. The next 600 l. plus 400 l. of the ensuing 1,000 liter 8–10 percent ammonia solution are conducted into storage vessel 3. The remainder of the second quantity of ammonia plus 400 l. of the ensuing 1,000 l. wash water, containing only small quantities of the aminocaproic acid to be obtained, are not conducted into storage vessel 3, but are utilized in the first desorption of the next exchange operation. In that manner, a concentration of the recovered aminocaproic acid to 25 percent is easily accomplished. The remaining wash water is drawn off until the level of the resin is reached, and the resin is rinsed with water for 15 minutes from below at a rate of 6,000 l./h., and the rinse water is removed by way of pipe 5.

Before re-use of the column, the resin must be reactivated again with sulfuric acid. This is carried out by conducting through the resin 2,000 l. 2n-sulfuric acid (in pipe 5 approximately 10 percent acid) at a speed of 3 cm.$^3$/min. The drawn-off solution containing free sulfuric acid and ammonium sulfate is neutralized with ammonia. The ammonium sulfate thus formed can be recovered by evaporation. The resin is washed with 1,000 l. water and rinsed from below at a rate of 6,000 l./h.

As soon as the outflowing liquid has a pH of 5–6, rinsing is terminated and the water in the column adjusted to the level of the resin. The column then is ready for a new reaction. It is self-evident that the rinse can be carried out only with totally demineralized water.

The aminocaproic acid containing excess ammonia is kept in storage vessel 3 and is converted into lactam as needed together with polyamide waste in the depolymerizer in the following manner:

201.3 kg./h. ε-aminocaproic acid from storage vessel 3 are conducted, by way of pump 3a, into the evaporator 6 where the ammonia present is evaporated and removed by way of pipe 7 to be re-used in the next desorption. Of the substantially ammonia-free solution, 190.3 kg./h. are entered into mixing vessel 8 into which simultaneously 651.6 kg. water from extraction 19 and 33.66 kg. water-soluble low-polymers, by way of pipe 21, are entered. In mixing vessel 8, 161.7 kg./h. water are evaporated and removed by way of pipe 9 so that the solution has the following composition: 651.6 kg. water, 33.66 kg. low-polymers and 28.7 kg. lactam (corresponding to 33.3 kg. ε-aminocaproic acid). Of this mixture, 714 kg./h. are entered in the polymerizer tube 12 by way of preheater 10 and by means of pump 11. During the same time, 28.57 kg. molten polyamide waste, from melting vessel 13, by way of dosing pump 14, are injected into tube 12. The depolymerization temperature is kept at 250° C. by means of heating jacket 15. The size of the reaction tube is measured so that the time of residence of the product therein is 7 hours. Gate 16 works in such a manner that 742.6 kg./h. solution are taken from the depolymerizer which are cooled to 20° C. in condenser 17. The aqueous solution flowing out is conducted through pipe 18 to the continuously charged extraction column 19, where the lactam is extracted with chloroform at a rate of 57.31 kg./h. The chloroform is entered by way of pipe 20. The lactam-containing chloroform solution is carried off through pipe 21. The remaining liquor containing at the same time 33.66 kg. low-polymers is cycled through pipe 22 to mixing vessel 8. The lactam solution obtained is freed from chloroform and is refined by known means, e.g., by distillation.

I claim as my invention:

1. A process for the recovery of lactam from waste polycaprolactam and from waters which had been used to wash low-molecular products, consisting of monomeric and low-polymeric lactam, out of polycaprolactam, which comprises hydrolizing and simultaneously concentrating said low-molecular products in said wash waters by absorption on an ion exchanger of the type Permutit RS, desorbing the concentrate with ammonia, heating the concentrated and desorbed aqueous solution together with said waste polycaprolactam at a temperature above 150° C. and up to 250° C., and extracting the lactam then present in said aqueous solution with a water-immiscible solvent, selected from the group consisting of chloroform, benzene and mixtures of benzene with cyclohexane.

2. A process for the recovery of lactam from waste polycaprolactam and from waters which had been used to wash low-molecular products, consisting of monomeric and low-polymeric lactam, out of polycaprolactam, which comprises hydrolizing said low-molecular products in said wash waters to aminocaproic acid by absorption on an ion exchanger of the type Permutit RS and simultaneously concentrating said acid in said waters, desorbing the concentrate from said ion exchanger with ammonia, converting said acid into lactam by heating the aqueous solution, together with said waste polycaprolactam, at temperatures above 150° C. and up to 250° C., and extracting the lactam then present from said conversion and from extraction of the waste polycaprolactam, with a water-immiscible solvent, selected from the group consisting of chloroform, benzene and mixtures of benzene with cyclohexane.

3. The process as claimed in claim 1, wherein the residue from said extract is recycled into the hydrolization.

References Cited in the file of this patent

FOREIGN PATENTS

| | | |
|---|---|---|
| 524,213 | Canada | Apr. 24, 1956 |
| 1,087,137 | France | Feb. 21, 1955 |

OTHER REFERENCES

Kunin et al.: Ion Exchange Resins, pp. 132–135 (1950).